United States Patent
Rivard

(10) Patent No.: US 6,402,123 B1
(45) Date of Patent: Jun. 11, 2002

(54) METHOD FOR PROPELLING A CABLE OR THE LIKE INTO A DUCT

(75) Inventor: Daniel Rivard, Daumeray (FR)

(73) Assignee: Marais SA, Mire (FR)

( * ) Notice: Subject to any disclaimer, the term of this patent is extended or adjusted under 35 U.S.C. 154(b) by 19 days.

(21) Appl. No.: 09/596,066

(22) Filed: Jun. 16, 2000

(30) Foreign Application Priority Data

Mar. 31, 2000 (FR) .............................................. 00 04087

(51) Int. Cl.$^7$ ................................................ B65H 59/00
(52) U.S. Cl. ................................................ 254/134.4
(58) Field of Search ................ 254/134.4, 134.3 FT; 15/104.31, 104.33; 184/15 R; 198/493, 500; 406/47, 49, 193, 117; 405/171; 175/65

(56) References Cited

U.S. PATENT DOCUMENTS

| 4,185,809 A | | 1/1980 | Jonnes | |
| 4,941,774 A | | 7/1990 | Harmstorf | |
| 5,456,450 A | * | 10/1995 | Reeve et al. | 254/134.4 |
| 5,762,321 A | | 6/1998 | Peterson et al. | |
| 6,116,578 A | * | 9/2000 | Pruett | 254/134.4 |

FOREIGN PATENT DOCUMENTS

| EP | 0264767 | 4/1988 |
| EP | 0427354 | 5/1991 |
| EP | 0467463 | 1/1992 |
| EP | 0665993 | 8/1995 |
| FR | 2774521 | 8/1999 |
| GB | 2171218 | 8/1986 |
| GB | 2229549 | 9/1990 |
| WO | 9217927 | 10/1992 |
| WO | 92-17927 | 10/1992 |
| WO | 9918465 | 4/1999 |
| WO | 99-40660 | 8/1999 |

* cited by examiner

Primary Examiner—Robert C. Watson
(74) Attorney, Agent, or Firm—Stevens, Davis, Miller & Mosher, LLP

(57) ABSTRACT

Method and device for propelling a cable or the like into a duct. According to the invention, said cable (2) is propelled into the duct (3) by the combined action of a flow of a pressurized liquid (14) and of a stream of pressurized gas (12), the pressure of said gas being greater than the pressure of said liquid.

4 Claims, 1 Drawing Sheet

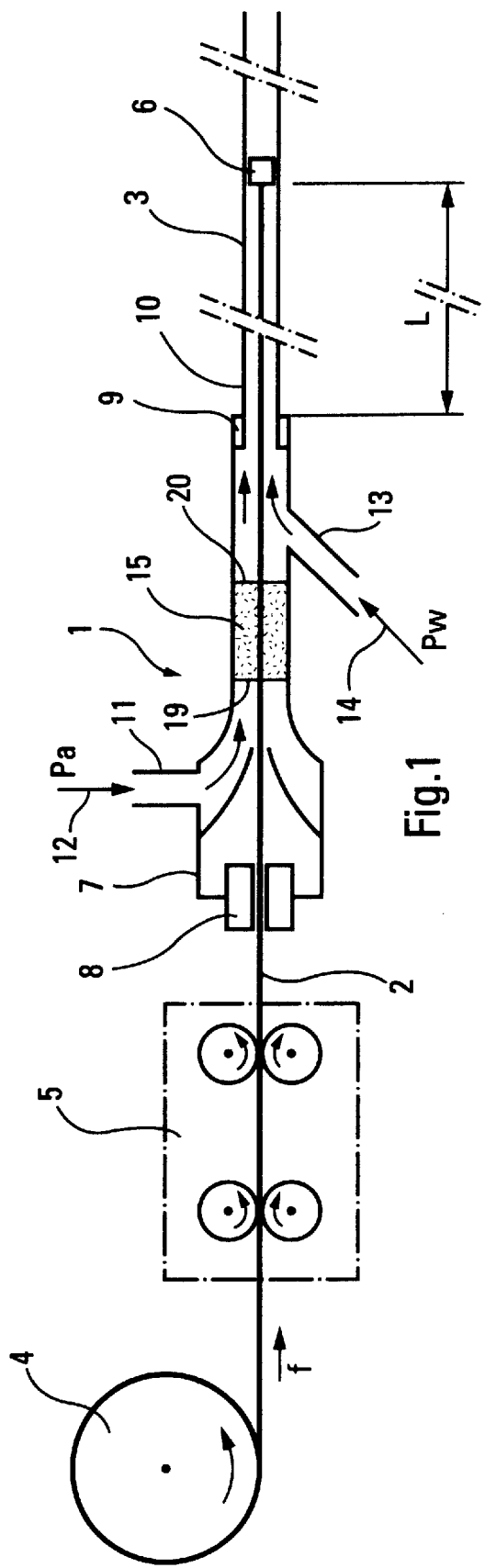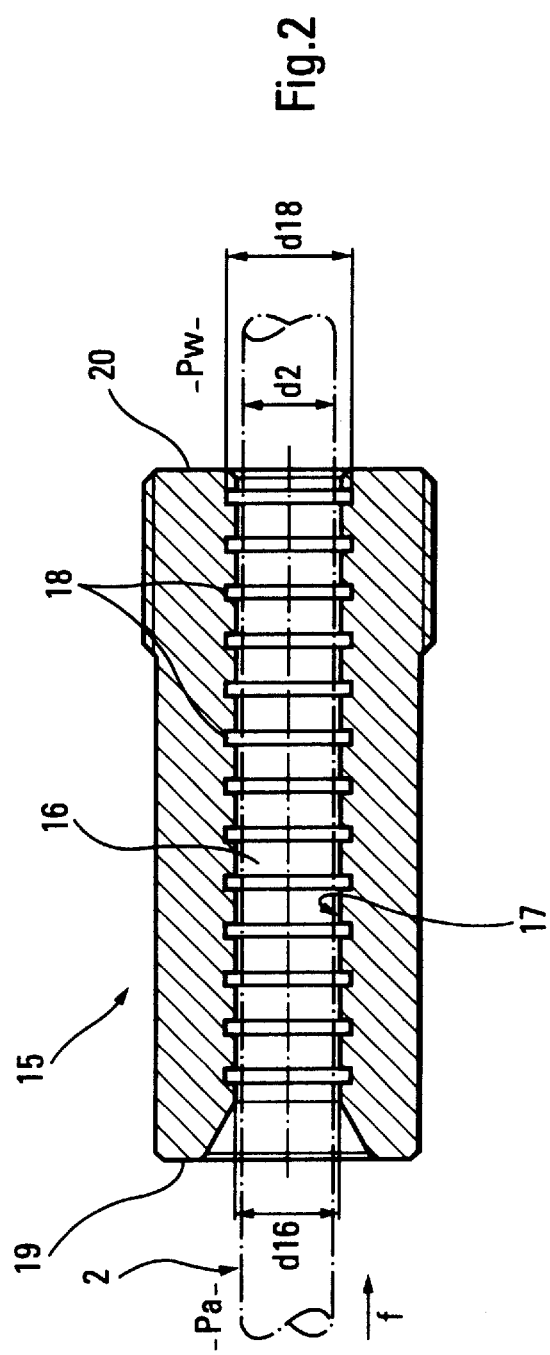

METHOD FOR PROPELLING A CABLE OR THE LIKE INTO A DUCT

The present invention relates to a method and to a device for propelling a cable or the like into a duct. It is most particularly, although not exclusively, suitable for installing electrical or optical cables inside pipes already buried in the ground.

Methods and devices are already known, for example from documents U.S. Pat. No. 4,185,809, GB-A-2,171,218, U.S. Pat. No. 4,941,774, GB-A-2,229,549, EP-A-0,264,767, EP-A-0,427,354, EP-A-0467,463, EP-A-0,665,993, U.S. Pat. No. 5,762,321, WO 92/17927 and WO 99/40660, which make it possible to propel a cable into a duct by means of a pressurized fluid introduced into the latter and capable of pushing or pulling said cable, the cable possibly being provided with fins and/or being attached to a pulling head which forms a piston inside the duct. Moreover, the fluid may be a liquid, such as water, or a gas, such as air.

Owing to the fact that the technique of pneumatic propulsion using a pressurized gas is expensive and only allows cable to be installed over limited duct lengths, the technique of hydraulic propulsion using a flow of liquid is generally preferred. The latter technique allows cables to be installed over very long duct lengths, is relatively easy to use and is not expensive. These advantages stem especially from the fact that the cable floats on or in the flow of liquid, thereby reducing the friction between the cable and the internal wall of the duct and allowing the cable to be advanced gently inside said duct.

However, such propulsion using a flow of liquid requires large amounts of liquid at a high pressure whenever it is desired to make the cable advance rapidly in a very long duct. This is because it will be readily understood that the speed of advance of the cable in the duct depends on the flow rate of the liquid in the latter and that the pressure losses are greater the longer the duct along which the cable has to travel.

Moreover, propulsion using a flow of liquid has the additional drawback that the cable, which generally floats on the surface of said liquid, can come into contact with the upper wall of the duct, a situation which then generates frictional forces, slowing down the advance of the cable.

The object of the present invention is to remedy these drawbacks. It relates to a method and to a device for liquid propulsion, allowing cable to be rapidly propelled into the duct without requiring said liquid to have a high flow rate and a high pressure, while preventing friction between the cable and the upper wall of the duct.

For this purpose, according to the invention, the method for propelling a cable or the like into a duct by means of a flow of a pressurized liquid, both said cable and said liquid being introduced at one of the ends of said duct, is noteworthy in that a stream of pressurized gas is also introduced into said duct, at said end of the latter, and in that the pressure of said gas is greater than the pressure of said liquid.

Thus, the pressurized gas injected into the duct fills those parts of the latter which are left free by the flow of pressurized liquid and by the cable and helps the liquid to entrain said cable. In addition, the pressurized gas allows the frictional forces between the cable and the internal wall of the duct to be limited. It therefore makes it possible, for a given liquid flow rate, to advance the cable more rapidly and a greater distance.

If, as is usual, the pressure of the liquid is increased in accordance with the distance traveled by said cable inside said duct, in order to compensate for the corresponding pressure losses, arrangements are made to ensure, according to the present invention, that, for each value of the liquid pressure, the gas pressure is equal to said value of the liquid pressure increased by a constant pressure surplus.

Experience has shown that, by virtue of the present invention, the maximum value of the liquid pressure in order to obtain satisfactory propulsion was at most equal to 15 bar for a ratio of the cross-sectional area of the cable to the cross-sectional area of the duct (occupancy) of about 60%. The constant pressure surplus may then be about 0.5 bar.

The present invention also relates to a device for propelling a cable or the like inside a duct, comprising first means for introducing said cable at one of the ends of said duct and second means for introducing a flow of pressurized liquid at said end of the duct in order to propel said cable. According to the invention, this device is then noteworthy in that it includes third means for introducing a stream of pressurized gas into said duct, at said end of the latter.

Preferably, said third means for introducing the stream of pressurized gas lie upstream, with respect to the direction of advance of said cable, of said second means for introducing the flow of pressurized liquid. In this case, it is advantageous for the device to include a nonreturn sealing means placed between said second and third means, which nonreturn sealing means allows said stream of pressurized gas to flow through it but prevents said flow of pressurized liquid from being directed upstream.

Also preferably, said first means for introducing the cable lie upstream of said second and third means for introducing the pressurized liquid and the pressurized gas. It is then advantageous for said nonreturn sealing means to be of the hydraulic high-pressure labyrinth seal type, through which seal said cable passes. In one embodiment, said nonreturn sealing means may then comprise a conduit whose internal diameter is slightly greater than the external diameter of said cable so that the latter can pass through said conduit while being in loose contact therewith, the internal wall of said conduit being provided with a plurality of grooves having a diameter greater than the internal diameter of said conduit.

The figures of the appended drawing will make it clearly understood how the invention may be realized. In these figures, identical reference numbers denote similar elements.

FIG. 1 illustrates, in schematic longitudinal section, the method and the device according to the present invention.

FIG. 2 is an axial section through one embodiment of the nonreturn sealing means used in the device according to the present invention.

The device 1, according to the present invention and illustrated schematically in FIG. 1, is intended to propel a cable or a similar elongate object 2 into a duct 3.

The cable 2 comes from a cable reserve 4, for example a reel, and its removal (pay-out) from said reserve may be assisted by a drive assistance device 5.

The duct 3, for example buried in the ground, is advantageously made of a high-density polyethylene and its internal wall may, in a known manner, be grooved and prelubricated in order to have a low coefficient of friction, for example of about 0.05.

Optionally, a pulling head 6, capable of acting in the manner of a piston inside the duct 3, is attached to the free end of the cable 2, i.e. the end on the opposite side to the cable reserve 4.

The device 1 comprises a casing 7 provided, at one of its ends, with a known sliding seal system 8 (for example of the type having lip seals) and, at its other end, sealed connection means 9 at an end 10 of the duct 3.

The cable 2 passes through the casing 7, entering therein via the sliding seal system 8 and leaving therefrom—in order to enter the duct 3—via the sealed connection means 9.

Downstream of the sliding seal system 8 with respect to the direction of advance f of the cable 2, the device 1 has an inlet 11 for a pressurized gas, for example air, shown symbolically by an arrow 12. In addition, downstream of this inlet 11, the device 1 has an inlet 13 for a pressurized liquid, for example water, shown symbolically by an arrow 14.

Moreover, a nonreturn sealing device 15, through which the cable 2 passes, is placed between the inlets 11 and 13. The device 15 allows the pressurized gas 12 to flow through it but prevents the liquid 14 from being directed upstream.

It will thus be understood that the pressurized gas 12 forms a stream which, together with the liquid flow formed by the liquid 14, enters said duct 3 via the end 10 of the latter through the sealed connector 9. Thus, the cable 2 is advanced into the duct 3 by the combined action of the flow of liquid 14 and the stream of gas 12.

The assistance device 5 helps the liquid 14 and the gas 12 to propel the cable 2 into the duct 3 when the speed of advance of said cable is low, for example below a predetermined threshold, but is disengaged when the speed of advance is above said threshold.

The pressure Pa of the gas 12 is chosen to be greater than the pressure Pw of the pressurized liquid 14.

If the distance L that the cable 2 has to travel inside the duct 3 is great (several hundreds of meters or even several kilometers), it is necessary to progressively increase the pressure Pw of the liquid in accordance with this distance L. Consequently, the pressure Pa of the gas 12 is then increased so that it always remains greater than the pressure Pw. For example arrangements may be made to ensure that, whatever the value of the pressure Pw, the pressure Pa is equal to the value of Pw increased by a constant pressure surplus dp.

During trials with the device 1 according to the present invention, it was found that, for a duct occupancy of about 60% (the occupancy is equal to the ratio of the cross section of the cable 2 to the cross section of the duct 3), the value of the liquid pressure Pw did not have to exceed 15 bar to obtain a satisfactory speed of advance for the cable 2, even for great distances L. The constant pressure surplus dp may then be about 0.5 bar.

The embodiment of the nonreturn sealing device 15 shown in FIG. 2 is of the hydraulic high-pressure labyrinth seal type. It comprises an internal conduit 16 whose diameter d16 is slightly greater than the external diameter d2 of the cable 2 which passes through it. Thus, said cable 2 may pass through the internal conduit 16 while being in loose contact therewith. Moreover, the internal wall 17 of the conduit 16 is provided with a plurality of grooves 18 whose diameter d18 is greater than the internal diameter d16 of the conduit 16.

Since, on the one hand, the upstream end 19—the left-hand end in FIG. 2—of the duct 16 is subjected to the pressure Pa of the stream of gas 12 while the downstream end 20—the right-hand end in said figure—of said conduit 16 is subjected to the pressure Pw of the flow of liquid 13 and, on the other hand, the pressure Pa is greater than the pressure Pw, the gas 12 can flow downstream by passing into the spaces between the cable 2 and the wall 17, while creating, in the latter spaces and in the grooves 18, pressure pockets preventing the liquid 14 from moving back upstream.

What is claimed is:

1. A method for propelling a cable or the like into a duct, comprising the steps of:

introducing together into a duct a cable and a propelling flow of a pressurized liquid and a propelling stream of a pressurized gas, said pressurized gas having a pressure greater than a pressure of said pressurized liquid; and using said pressurized liquid to fill parts of said duct being left free by said propelling flow of pressurized gas and by said cable, wherein said cable is advanced into said duct by the combined action of said propelling flow of pressurized liquid and said propelling stream of pressurized gas.

2. The method as claimed in claim 1, wherein the pressure of the liquid is increased in accordance with a distance traveled by said cable inside said duct, wherein, for each value of the pressure of the liquid, the pressure of the gas is equal to said value of the pressure of the liquid increased by a constant pressure surplus.

3. The method as claimed in claim 2, wherein the maximum value of the pressure of the liquid is at most equal to 15 bar for an occupancy of said duct of about 60%.

4. The method as claimed in claim 2, wherein said constant pressure surplus is about 0.5 bar.

* * * * *